United States Patent [19]

Bricot et al.

[11] Patent Number: 4,562,564
[45] Date of Patent: Dec. 31, 1985

[54] PROCESS AND OPTICAL DEVICE FOR GENERATING SIGNALS CONTROLLING THE POSITION OF A SCANNING SPOT OF THE TRACKS OF A DATA CARRIER

[75] Inventors: Claude Bricot; Pierre Bérthet; Jean-Louis Gérard, all of Paris, France

[73] Assignee: Thomson-CSF, Paris, France

[21] Appl. No.: 473,539

[22] Filed: Mar. 9, 1983

[30] Foreign Application Priority Data

Mar. 12, 1982 [FR] France .................................. 82 04221

[51] Int. Cl.⁴ ............................................... G11B 7/00
[52] U.S. Cl. .......................................... 369/44; 369/45
[58] Field of Search ............................... 250/201–204; 369/43, 44–46, 112, 111, 109; 358/342

[56] References Cited

U.S. PATENT DOCUMENTS 3,919,697 11/1975 Walker .
4,443,870 4/1984 Hazel et al. ............................ 369/44

FOREIGN PATENT DOCUMENTS

0032271 7/1981 European Pat. Off. .
2312091 12/1976 France .
2347743 11/1977 France .
2420182 10/1979 France .

Primary Examiner—Robert L. Richardson
Attorney, Agent, or Firm—Oblon, Fisher, Spivak, McClelland & Maier

[57] ABSTRACT

The process makes it possible to generate on the basis of discrete preetching elements or flags, the radial tracking error and/or focusing error signals. The flags comprise portions displaced with respect to the mean axis of the tracks to be followed. According to a first variant, each track comprises portions displaced on either side of the axis. According to a second variant the flags comprise portions alternately displaced to one and then the other side thereof. In response to the passages of these portions, windows are generated and the pulses supplied by the photodetectors of the interaction of these portions on the focused scan beam are compared between successive windows.

16 Claims, 14 Drawing Figures

PROCESS AND OPTICAL DEVICE FOR GENERATING SIGNALS CONTROLLING THE POSITION OF A SCANNING SPOT OF THE TRACKS OF A DATA CARRIER

BACKGROUND OF THE INVENTION

The present invention relates to a process making it possible to radially follow or track a track of an optical data carrier, particularly in the form of a disk, using a light energy beam, as well as the focusing of this beam on a given plane of the carrier. The invention also relates to a device making it possible to perform this process.

Numerous processes for radially following tracks are known from the prior art. When it is a question of recording information in sequential form, e.g. video information, generally the tracks are not materialized beforehand and are instead produced in real time at the moment of recording. The information is recorded along tracks in the form of a single spiral extending from the peripheral area of the disk to a central area or vice versa, or in the form of concentric circles centred on the rotation axis of the disk. In the simplest systems, the accuracy of the recording head advance means are a prerequisite for producing this track. During reading, information recorded e.g. in the form of microreliefs, interferes with a reading beam focused in the plane of the recording face of the disk. The passage of these microreliefs beneath the focusing spot modulates the beam and this modulation is detected with the aid of photoelectric cells, which convert the light intensity variations into electrical signals, which can also be used for the purpose of following the tracks.

The aforementioned process requires a very high degree of mechanical stability of the advance of the recording head, in order to prevent an overlap of two successive grooves or at least become difficult to distinguish during reading. In order to improve the system described hereinbefore, U.S. Pat. No. 4,275,275 proposes a process using the last track recorded or one of the previously recorded tracks as a reference. A system for the optical deflection of the recording spot is added to the mechanical advance system of the recording head. The reading spot is made to follow an already recorded groove of the track by a conventional position control. With the aid of the optical deflection system, the recording spot is kept at a constant distance from the reading spot, which is equal to an integral multiple of the pitch of the track.

However, when it is desired to record information in a random manner, for example in informatics application, it is no longer possible to use the aforementioned processes or similar processes. It is generally necessary to materialize beforehand the tracks before which the information can be recorded. For this purpose it is conventional practice to produce a preetching in some form. According to an embodiment described in U.S. Pat. Nos. 4,252,889, 4,288,510 and 4,334,007 during the production of the carrier, the tracks are materialized in the form of a smooth groove made in an auxiliary coating of said carrier. These tracks can be detected even in the absence of any information recording, the latter being carried out in a subsequent phase in a photosensitive or thermosensitive coating in contact with the auxiliary coating.

In a preferred variant of the prior art, the preetched tracks can coincide with the regions in which the information is recorded, which leads to a so-called single-track system.

According to other processes, the preetched track or tracks are separate from the tracks along which the information is recorded, giving so-called two-track systems. In order to discriminate these two different type of track, it is possible to proceed in such a way that the preetching consists of a signal which can be broken down into a first frequency spectrum, whilst the information can be broken down into a second separate frequency spectrum. During writing, it is possible to use the reading beam for following the preetched track, in accordance with aforementioned U.S. Patents.

The main disadvantage of the process described hereinbefore is that it does not permit a maximum recording density, because it requires a minimum of one supplementary preetched track for one preetched information track. In addition, it requires the use of two beams, one for the radial tracking of the preetched track and the other for the writing or reading of information on the track used for recording.

In addition, single-track carriers having a preetching are also not free from disadvantages. They generally require the use of two beams, one for recording and the other for radial tracking. In addition, even if the preetched track can easily be distinguished from the remainder of the disk (intertrack areas) when no information is recorded, this does not apply when information has been recorded. Thus, if precautions are not taken, there can be inversions of contrasts leading to tracking errors.

To obviate these disadvantages, French Patent Application 82 04 214 proposes a radial tracking device utilizing a data carrier having a preetching used for the radial following of the track constituted solely by flags, which are regularly or non-regularly distributed along the tracks.

According to this French application, the preetching is constituted by a sequence of discrete non-contiguous elements materializing the mean axis of the tracks. The spatial distribution of these discrete elements may or may not be uniform. According to a first variant, each discrete element is constituted by a smooth track portion. According to a second variant, each discrete element has several portions defining the special code. According to supplementary variants, each element has, apart from a portion centred on the mean axis of the tracks, one or more portions which are displaced with respect to the mean axis. Finally, each of the preetchings can be preceded by an auxiliary preetching element used for synchronization purposes. The track following device comprises photodetectors, measuring circuits incorporating sampling—inhibiting means or memory-possessing integrators, as well as sampling circuits. A track radial following error signal is processed on the basis of the evolution of signals detected during successive passages in an illuminated area of the disk surface by a track following spot.

Apart from the correct radial tracking ensured by the preferred process described hereinbefore, a second requirement linked with the reading or writing of information on an optical carrier, involves the focusing of the light energy beam or beams used, which must be focused on the carrier at a spot, which must permanently follow possible fluctuations of the level of the tracks.

In order to obtain this, it is known that the correct focusing of the beam is most frequently obtained by means of a focusing control device having a feedback loop, which maintains the distance between the optical device and the etched surface of the carrier completely constant. The synchronization and maintenance of the control device are obtained by detecting fluctuations of an electrical signal which, according to a first variant, is derived from reading the recorded information and, in a second variant, from the detection of the preetching materializing the tracks, e.g. in the form of a smooth groove. Thus, the same difficulties as referred to hereinbefore in connection with radial tracking are encountered.

BRIEF SUMMARY OF THE INVENTION

The problem of the invention is to obviate the disadvantages of the prior art and proposes a process and a device for performing this process permitting simultaneous radial following or tracking and focusing, whilst overcoming the difficulties linked with losses of contrast in the conventional systems.

The invention therefore specifically relates to a process for generating at least one signal for controlling the position of a light spot for scanning the tracks of an optical carrier of mobile information, the tracks having mean axes arranged in accordance with a give configuration, the carrier being realized in an optical apparatus for the transcription of information comprising at least one radiant energy source associated with an objective in order to form the scanning spot of a reference surface of the carrier and optoelectronic detection means collecting radiation emerging from the portion of the reference surface illuminated by the scanning spot in at least one representative electrical output signal, wherein it comprises the stages of writing along the said tracks discrete non-contiguous preetching elements surrounding the areas to be used for recording the information, said elements having at least one portion displaced to one side of the mean axes and two successive preetching elements having at least one portion displaced to one side and a portion displaced to the other side; selective detection of the passage of the displaced portions of the discrete preetching elements in the part of the reference plane illuminated by the scanning spot and the generation, conditional on said detection, of pulses defining analysis windows during the said passages; comparison of the amplitude of the output signals supplied by the optoelectronic detection means during the analysis windows corresponding to the passages in said illuminated part of two successive portions displaced in opposite directions and generation of the control signal on the basis of the result of this comparison.

The invention also relates to an optical device for performing this process.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

The invention relates to a process and to a device for radially following or tracking a track on an information carrier of the preetched type, together with the necessary focusing. Reference is briefly made to the main components of a system for writing and/or reading information carriers, particularly in the support of optically writable and readable disks.

Figure 1:
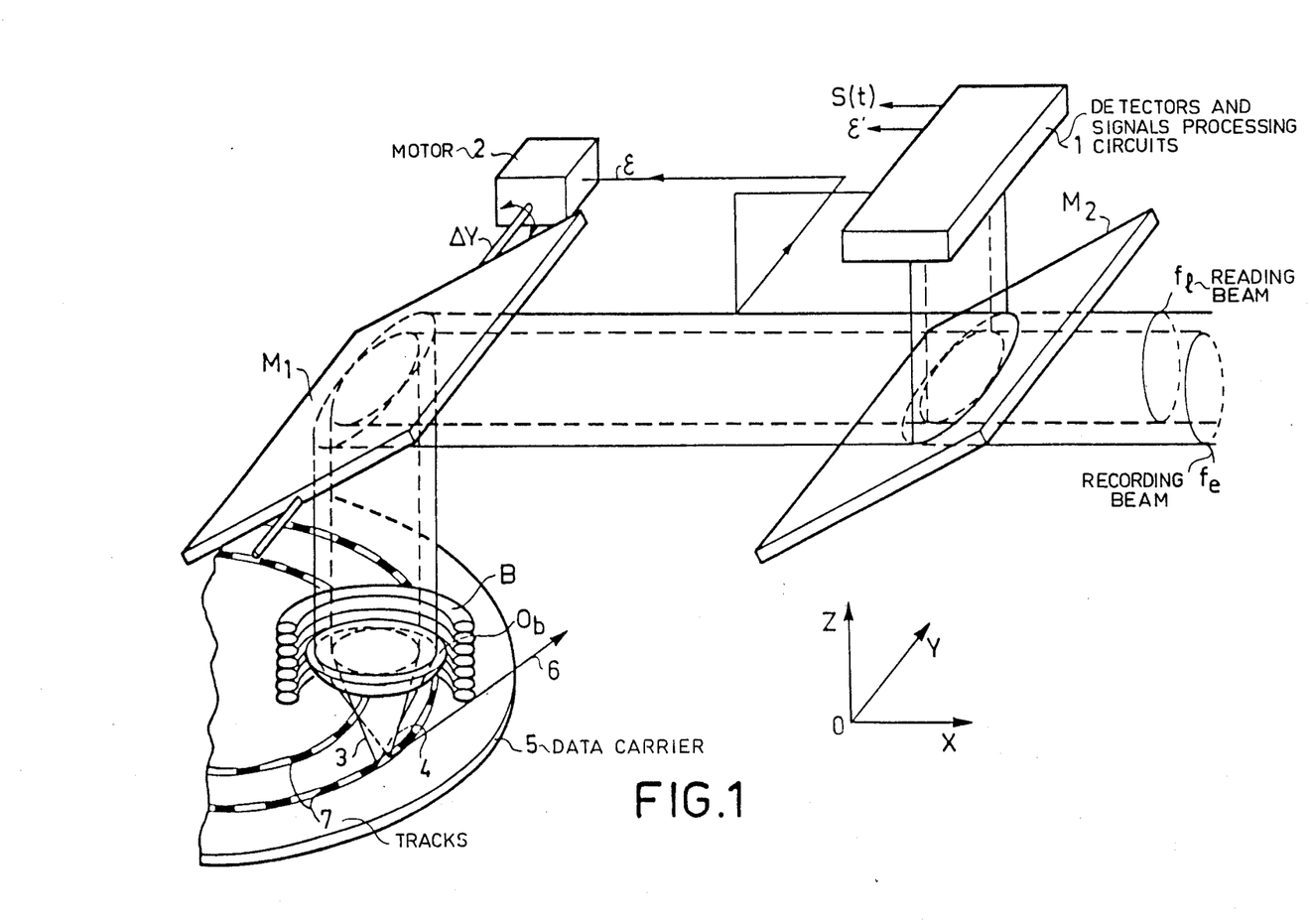
FIG. 1 a disk according to the prior art and a device for following the track on such a disk and for focusing.

FIG. 1 shows a prior art data carrier 5 in the form of a circular disk able to rotate in a plane XOY about an axis parallel to the third axis of a reference trihedron XYZ. The lower face of the disk is assumed to be smooth and the upper parallel face is also smooth, but has a preetched track 7 in the form of a smooth track, which has a substantially constant width equal to or below 1 micrometer.

Such a disk can be used either for recording information at a given point on one of the pre-recorded smooth tracks, or for reading information recorded at a random point on said track. The disk, which has for example a diameter of approximately 30 cm, performs a rotary movement imparted by a drive motor integral with the chassis of the optical writing—reading system. In this embodiment, the access device to a given track of the disk comprises a fixed part having two light energy sources (not shown in FIG. 1) and a moving part constituted by the recording—reading head. As is known, the latter comprises a microscope-type objective $O_b$, integral with an electromagnetic coil B moving in the magnetic field of a not shown permanent magnet ensuring the vertical control or focusing, as well as a galvanometer mirror $M_1$ ensuring the radial control. As is also known, the light energy sources comprise laser sources, e.g. semiconductor on HeNe gas lasers. The gas lasers supply a polarized parallel beam having a small cross-section. The laser beam must be magnified in such a way that it covers the entrance pupil of the objective, no matter what the position of the latter along the optical axis. To achieve this, U.S. patent application Ser. No. 174,564 of Aug. 3rd 1979 proposes the placing of afocal optics between the light energy sources and the movable recording—reading head.

For reading, a parallel laser beam $f_1$ produced by a laser source (not shown in FIG. 1) is magnified with the aid of an afocal optics, whose magnification is such that the also parallel emergent beam covers the entrance pupil of objective $O_b$. Mirror $M_1$ deflects the rays propagating parallel to a direction parallel to axis OX. Objective $O_b$ focuses the reading beam at point 3 on to the information carrier disk 5, which performs a rotary movement indicated by arrow 6. The objective and the mirror are fixed to a moving element constituting the recording—reading head. The advance of this moving system can be obtained by any known means.

The same afocal means is then used for the recording beam $f_e$, which has been previously modulated. In order to be able to differentiate the reading and recording spots on the disk, the recording beam $f_e$ is inclined very slightly with respect to the reading beam $f_1$, in such a way that the offcentring of the recording beam on the entrance pupil of the objective is very limited and it is possible to ignore the displacement of the beam during a radial displacement of the head. It follows that no matter what the position of the objective along the optical axis, the writing or recording beam is focused on the focal point of the objective and namely at point 4.

The preetching of the track in the form of a smooth groove 7 can take place in several different ways. For example, it can be a hollow preetching, on the basis of a group of track elements in the form of concentric circles or in the form of a spiral. The width of the track elements is made slightly less than the diameter of the light spot and these elements are separated by intertrack regions, whose width slightly exceeds the width of the track. The upper surface of the carrier receives a thin coating which is suitable for recording by a thermooptical process. This arrangement of elements makes it possible to scan the track prior to recording, because the interaction of the reading spot with the track supplies dispersed radiation, whereas the intertrack regions do not generate dispersion.

With regards to the recording phase of the disk, the illumination of the sensitive coating used for writing is carried out by a spot, whose intensity is modulated e.g. by an electrical signal in square-wave pulses of variable or constant widths, as a function of the applications of the data carrier. According to the particular case, the incorporation of the information into the modulator signal is carried out by frequency or phase modulation, or by any other coding method able to supply a pulse-coded message, whilst the information can itself directly be the modulator signal.

In order to detect the reading beams reflected by the disk, e.g. a semitransparent plate $M_2$ is placed in the path of the beam $f_1$. The reflected beam is then transmitted to photodetector and signal processing means 1, which are able to supply on the one hand an error signal $\epsilon$ making it possible to control the motor 2 permitting the control of the position of mirror $M_1$ by effecting in this way a radial control, and on the other hand an error signal $\epsilon'$ making it possible to control coil B fixed to objective OB, by thus carrying out a focusing control. All these procedures are well known to the Expert and fall outside the scope of the invention.

The processing means can also supply a signal S(t) representing the useful information recorded on the disk. Thus, during the passage of the recorded elements on tracks 7, on reading a signal S(t) is collected, which faithfully reproduces the time variations of the signal recorded on the track. In the writing phase, the reading beam $f_1$ is used for ensuring the radial control with the aid of the preetching, but also can be used for real time control of the information during recording, or for monitoring.

Although it only requires a single surface corresponding to the width of a single track, as opposed to the processes using one or two adjacent preetched tracks or which surround the useful track, the aforementioned prior art process (cf. FIG. 1) has a number of disadvantages. From the detection standpoint, everything takes place as if for certain known thermosensitive materials, the tracks were darker than the intertrack regions. Thus, any variation in the track following can easily be detected as a result of this contrast. When the coating covering the carrier is subject to recording radiation, the recorded areas can be illuminated for certain photosensitive materials, which helps to produce a good contrast along the track. However, these illuminated areas tend to coincide with the lowest density of the neighbouring intertrack areas, so that radially the contrast necessary for ensuring good track following is lost. The reverse effect occurs with certain other materials, the intertrack areas being darker than the tracks, but there is also a contrast loss during recording.

Thus, the recording or writing is prejudicial to the good radial definition of the tracks in all the areas where the track has stored data. Thus, the disadvantages greatly limit the technological choices with respect to the possible materials.

In addition, two different beams must be used, at least during the recording periods, namely a writing beam and a reading and/or radial tracking beam.

To overcome these limitations, French Patent Application 82 04 214 proposes the use of a particular type of preetching for radial control purposes. It proposes the use of a preetched optical disk which, apart from other advantages, simultaneously enables the use of a single-track configuration and the use of only one beam, without the preetching interfering with the etching representing the useful information.

According to the main feature of the invention, the preetching is in the form of discrete elements or flags, which alone define the mean axis of the track to be followed. Thus, this track is virtual. Bearing in mind the rotation speed of the disk, the spatial distribution of these preetching elements must be adequate to satisfy the SHANNON criterion. Thus, typically on a diameter 30 cm disk, a 8 cm wide ring represents the useful recording area, there being approximately 40,000 tracks, each having approximately 3,500 flags.

The main but not the sole application envisaged by the invention is the recording of digital data, so that a description will now be given of a carrier on which the tracks are distributed in the form of concentric, equidistant circles. The useful information is recorded between two successive flags. If a block-form recording configuration is required, the spatial distribution of the flags is preferably uniform. The use of a discrete preetching makes it possible to overcome the problems linked with radial tracking.

By making a choice from among the variants proposed in the aforementioned patent application and which will be defined hereinafter, it is also possible to obtain the information necessary for the correct focusing of the beam, or for vertical control on the basis of these flags.

Figure 2:
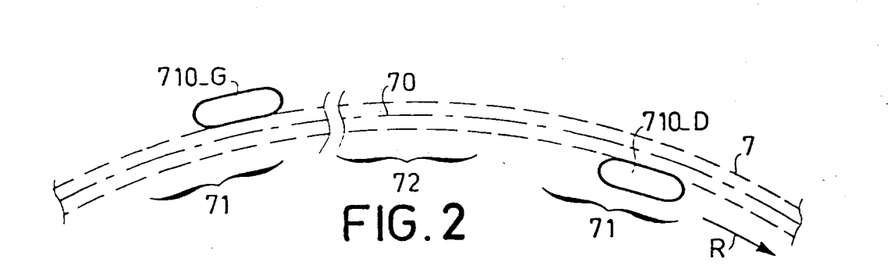
FIGS. 2 to 5 the preetching of the disk according to several variants of the invention.

FIG. 2 illustrates a first embodiment of a flag usable in the present invention. The preetching is in the form of portions of smooth track 71 defining the mean axis 70 of the tracks along which the information can be recorded. Between two flags 71, there is an area 72 which is free of all information before recording. In FIG. 2, the disk rotation direction is indicated by arrow R.

It is to be understood that track 7 shown in FIG. 2 is a virtual track, whose mean axis 70 represents the ideal trajectory to be followed by a writing beam.

To be usable within the scope of the invention, the flags have in each case at least one preetching portion displaced relative to the mean axis 70 of track 7, in such a way that two successive displaced portions are positioned on either side of said axis.

According to a first and simplest variant, illustrated in FIG. 2, a first flag 71 has a portion 710-G displaced to the left of the mean axis of the track. The following flag 71' has a portion 710-D displaced to the right of the axis. This succession is repeated. The variation between the displaced portions and track axis 70 is a fraction of the width of the tracking spot.

Figure 3:
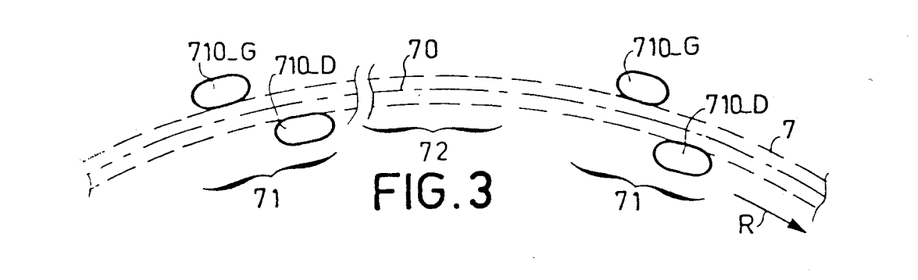

According to a second variant, each flag has at least one portion displaced to the left and one portion displaced to the right, as is illustrated by FIG. 3.

Figure 4:
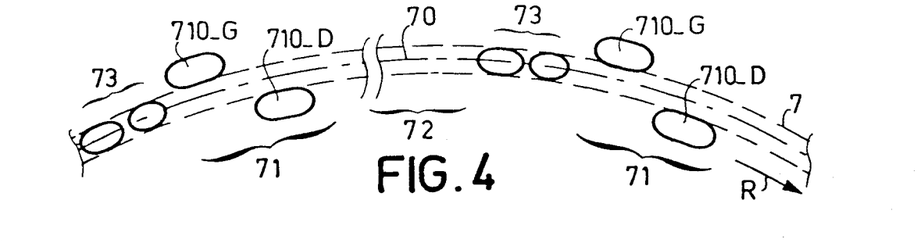

It may be advantageous to associate a second flag 73 used for generating a flag start identification or synchronization signal with the main flag 71, having portions displaced on either side of the mean axis 70. In a preferred manner, flag 73 has a special code making it possible to selectively identify it compared with the other recorded information. Such a configuration is illustrated by FIG. 4.

The precise way in which the information is recorded falls outside the scope of the invention. Any known process can be used. Flags 71, 71' and the useful information recorded in areas 72 can, in non-limitative manner, be constituted by microreliefs in the form of hills or valleys, e.g. by the ablation of a surface coating with the aid of a laser writing beam. In a preferred manner, the portions of the flags all have the same width and the displaced portions 710-G and 710-D have the same length and displacement.

All variations and combinations based on the fundamental configurations of the flags remain within the scope of the invention. In particular, each flag 71 or 71' can have more than one portion displaced in the same direction, to the right and/or left.

In addition, areas 72 reserved for recording useful information data can also be preetched in the form of a smooth groove, in order to improve the contrast as a function of the thermosensitive material coating used.

Thus, the invention has the fundamental feature of alternately displacing the areas having the recordings and which are to be used by radial and vertical control (or focusing) means.

With regards to the radial control, the signals derived from the detection of the displaced portions make it possible to obtain an error signal by comparison. This process is similar to the so-called "wobbulation of the tracking spot process", by which is imposed on the tracking beam, a high frequency radial oscillation of constant amplitude about a mean position centred on the mean axis of the track, when the tracking error is zero. However, it has the advantage that the amplitude of the relative spot—track displacement is not limited by the modulation level of the read high frequency signal. Typically the peak amplitude of the oscillation is approximately 0.2 μm for tracks having a width of approximately 1 μm.

Within the scope of the invention, the amplitude of the equivalent oscillation due to the displacement can be much greater and is only limited by the size of the reading spot. The amplitude modulation produced by the displacement of the portions does not affect the high frequency signal of the post-etched information.

The comparison of two signals derived from successive detections of two portions displaced in opposite directions, takes place by sampling, provided that the timing of the passage of these portions in the spot are known, i.e. it must be possible to differentiate these portions. This differentiation can be carried out according to three main methods.

According to the first method, each portion can be recognized by its shape, which indicates whether it is to the right or to the left of the mean axis 70. In place of a single portion, it is possible to record several portions, whereof the respective lengths and/or the spatial distribution represents a selectively detectable code. In an identical manner to the configuration shown in FIG. 4, it is possible to associate with each flag 71, a supplementary flag representing a code indicating the direction of the displacement of the portion which follows or optionally there is a succession of portions displaced to either side of the mean axis 70. The relative amplitudes of the signals derived from the detection of two portions having opposite displacements by optoelectronic means to be defined hereinafter, can therefore be compared without ambiguity.

Figure 5:
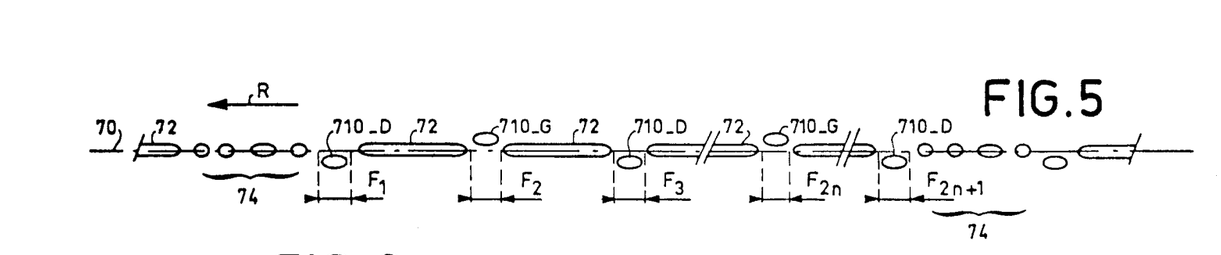

According to the second information, the data carrier is divided into sectors. For example, in the case of a disk, there are typically 16 sectors per revolution. A preetched flag of a particular configuration making it possible to detect the start of a sector is then recorded. Such an arrangement is illustrated by FIG. 5. The start of each sector is marked by a coded flag 74 followed by a repetitive succession, e.g. right-hand portion 710-D, useful information data recording area 72, left-hand portion 710-G. These different portions alternately displaced in different directions, define two sequences of analysis windows, respectively $F_1, F_3, \ldots, F_{2n+1}$ and $F_2, F_4, \ldots, F_n$, $(2n+1)$ being the total number of analysis windows, i.e. the total number of displaced portions 710-D and 710-G. In the example illustrated by FIG. 5, areas 72 are formed by portions of smooth grooves before recording. In a variant, as in the case of the configurations illustrated by FIGS. 2 to 4, areas 72 can coincide with the intertrack areas before recording.

The radial tracking error signal is obtained by integrating the signal detected by optoelectronic means during analysis windows $F_1$ to $F_{2n+1}$ on the one hand and $F_2$ to $F_{2n}$ on the other and comparing them.

Figure 6:
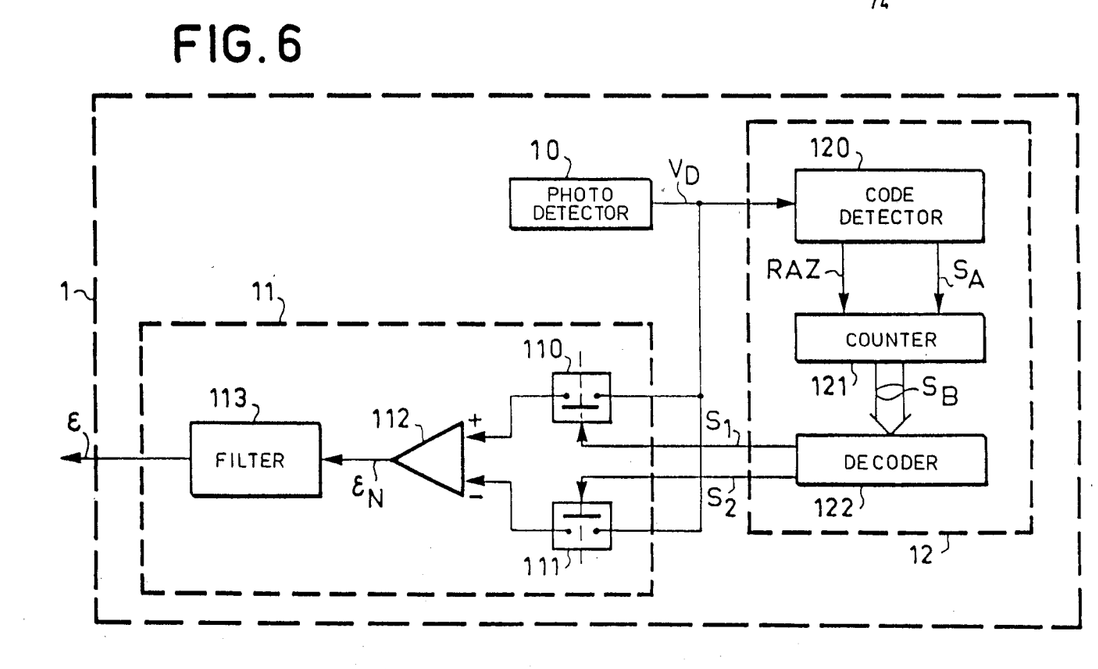
FIGS. 6 and 7 are circuit diagrams of the radial tracking devices according to several variants of the invention.

An electronic circuit permitting an operation of a radial tracking device in accordance with this variant is illustrated in FIG. 6. The system for recording—reading information on the disk can be identical to that described relative to FIG. 1. The identical elements will not be described again. Only circuit 1, which processes the focusing and radial tracking error signal is specific. It comprises an optoelectronic detection member 10, which will be described in greater detail hereinafter. This member comprises at least one photodetector generating an output signal $V_D$ transmitted to circuits 11 for processing the radial tracking error signal ε. This signal is also transmitted to sampling circuits 12 for authorizing the operation of circuits 11 during the time intervals corresponding to the analysis windows. For this purpose, these circuits comprise flag identification circuits 120, an e.g. binary counter 121 and a decoder 122. The flag identification circuits comprise a first circuit detecting the flag specific to the start of sector 74 (FIG. 5) and, in response, generating a resetting signal or starting counter 121 transmitted to a resetting input, and a second circuit detecting the passage of the displaced portions 710-D and 710-G and for each passage generating a signal $S_A$ for the incrementation of counter 121. The bits of a binary word $S_B$ transmitted to a decoder are permanently present on the different outputs of this counter. On each incrementation, the decoder generates pulses alternately transmitted on two control connections $S_1$ and $S_2$ activating switches 110 and 111 during analysis windows corresponding to the series $F_1, F_3, \ldots, F_{2n+1}$ and on output $S_2$ pulses defining the analysis windows corresponding to the series $F_2, F_4, \ldots, F_{2n}$.

Each of the switches 110, 111 receives the signal $V_D$ and conditionally transmit it during the analysis windows to a memory-possessing integrator 112 having two differential inputs (+ and −), in such a way as to perform successive comparisons between the signals due to the interruptions between the tracking spot and respectively the portions displaced to the right and left.

The selective identification of the portions 710-D and 710-G by circuits 120 can take place in different ways. For example, it is possible to associate each portion with a supplementary flag for synchronizing the start of sampling in a manner identical to that used in FIG. 4 (flag 73). It is also possible to record several portions 710-D or 710-G, whose respective distribution and/or lengths define a special displaced portion code differing from those used for recording the other data.

Figure 7:
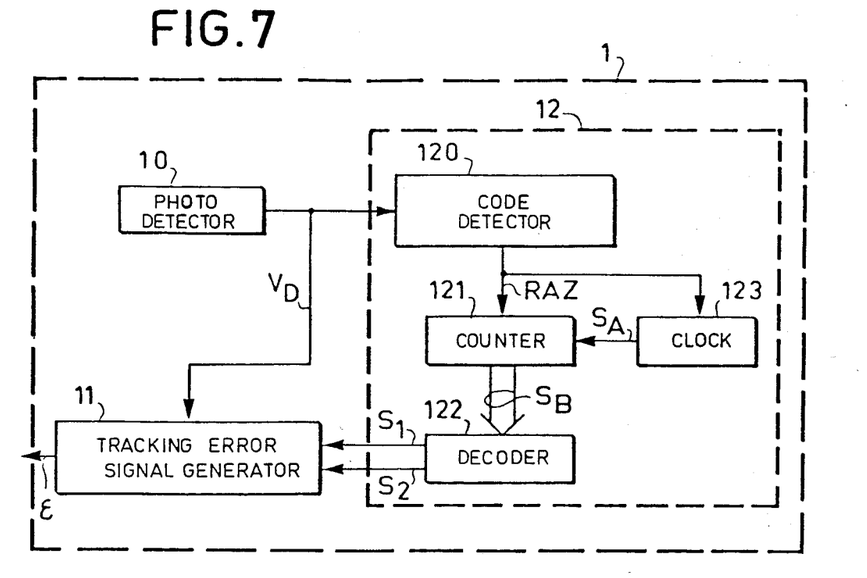

If the medium—reading head speed is sufficiently stable and the lengths of areas 72 are accurately defined, once the counter 121 has been restarted, it is merely necessary to generate a sequence of incrementation pulses with the aid of a clock, e.g. a voltage controlled oscillator or VCO, this variant being diagrammatically illustrated in FIG. 7. Elements which are identical to those of FIG. 6 carry the same references and will not be described again. The resetting signal supplied by circuits 120, which now only have one sector start detecting circuit (flag 74) is also transmitted to clocks 123, in order to retime the phase thereof with the passage of flag 74. The clocks then generate a sequence of pulses with a repetition rate equal to $1/T$, T being the time necessary for the passage of an area 72 beneath the scanning spot. To prevent any risk of an excessive phase shift, which would lead to the generation of analysis window desynchronized relative to the passage of the displaced portions, it is possible to increase the number of flags 74 in each sector. This leads to a typical configuration of one flag 74 followed by 16 displaced portions.

In the two variants described relative to FIGS. 6 and 7, it is possible to replace counter 121 by a shift register or any equivalent means recording a logic 1 on passages of flags 74 and displacing said bit for each new passage of the displaced portions.

In the two variants, the output signal of integrator $\epsilon_N$ is a staircase signal, the amplitude thereof being stored between two passages of displaced portions. To permit its use, this signal must be "smoothed". It is possible to use for this purpose a low-pass filter 113, at the output of which is available the radial tracking error signal $\epsilon$.

Figure 8:
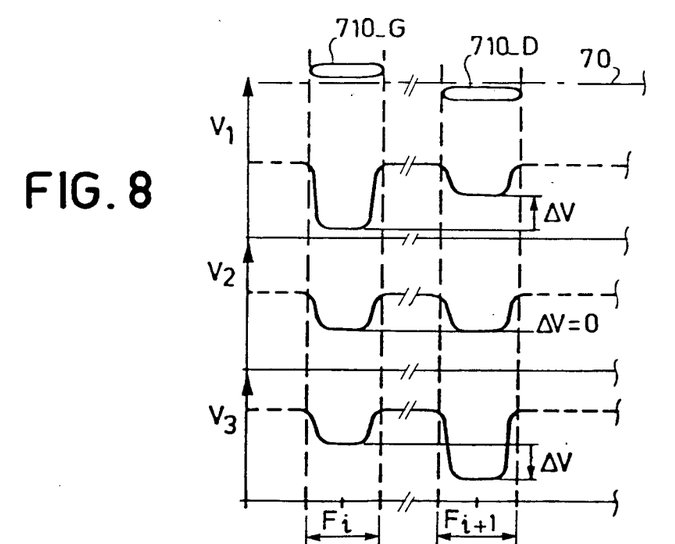
FIGS. 8 and 9 diagrams explaining the operation of the devices.

FIG. 8 illustrates three possibilities characteristic of the position of the track following spot compared with the mean axis of track 70. In the upper part of the diagram, curve $V_1$ illustrates the case in which the track following spot is displaced to the left of the mean axis of the track, it being understood that the rotation direction is as indicated by arrow R in FIG. 5. In this case, the interaction of portion 710-G with the track following beam is greater than that of portion 710-D. Curve $V_1$ has a greater amplitude variation during analysis window $F_i$ (i being a random number between 1 and 2n) corresponding to the passage of portion 710-G in the area illuminated by the track following spot, than the amplitude variation during analysis window $F_{i+1}$ corresponding to the passage of portion 710-D. The amplitude and sign differences between these two signals $\Delta V$ are representative of the direction and amplitude of the spot displacement relative to the mean axis of the track. Outside these windows, the signal supplied by the detection means is not transmitted to circuits 112, the switches being open.

In the median part of the diagram, curve $V_2$ illustrates the case when the track following spot is centred on the mean axis of the track. The variations of the signal supplied by the detection means 10 in windows $F_i$ and $F_{i+1}$ are identical.

In the lower part of the diagram, curve $V_3$ represents the case in which the track following spot is displaced to the right with respect to the mean axis of the track. The value of the thus sampled signals is then stored up to the next analysis window. At its output, circuit 112 supplies a staircase signal $\epsilon_N$ representing the radial tracking error. In order that it can in fact be used, this signal is smoothed with the aid of a lowpass filter 113, whose output supplies the radial tracking error.

Figure 9:
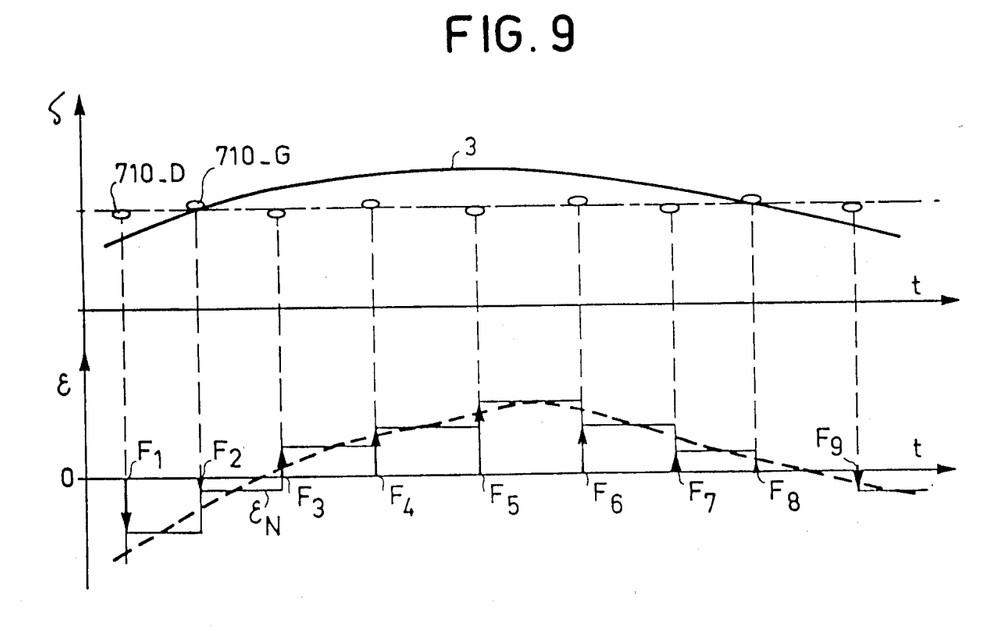

FIG. 9 represents an example of a displacement variation $\delta$ of the radial tracking spot 3 compared with the mean axis 70 of a track as a function of time. In the lower part of the diagram is shown the corresponding variation of the error signal $\epsilon$ as a function of time by means of a dotted line curve. The variation of the digital radial tracking error signal $\epsilon_N$ is also shown in the same diagram. The latter signal varies with the timing of the passage of displaced flag portions beneath the radial tracking spot and remains constant between two successive passages.

According to the third method, which is similar to the second, between two areas 72 is recorded a flag having at least one pair of portions displaced in opposite directions. The configuration is as described relative to FIG. 3. As hereinbefore, these flags can be auto-identifiable or can be associated with supplementary coded flags in the same way as has been described relative to FIG. 4.

According to this method, the circuitry is simplified, because it is no longer necessary to make a distinction between the two sequences of analysis windows. For each flag passage, it is merely necessary to alternately transmit signal $V_D$ to the differential inputs of integrator 112 with the aid of a two-channel switch, in a manner related with the passage of the successive displaced portions.

Finally, if the passage speed is sufficiently stable and the length of areas 72 well defined, it is also possible to omit the flag detectors and synchronize the generation of the analysis windows by means of an external clock, which can be derived from that conventionally used for supplying synchronizing signals during the writing and/or reading of useful information data. The repetition rate is the so-called bit frequency, i.e. is equal to the inverse of the time interval necessary for the reading of an information bit. The situations with regards to the tracking spot position are like those illustrated in FIG. 8, with the exception that the output signals of the optoelectronic detection means associated with the portions displaced in opposite directions are contiguous in time and are not located in the analysis windows separated by the time interval necessary for the passage of the interflag area 72 in the tracking spot.

In all the variants described hereinbefore, it is possible to replace integration (FIG. 6: integrator 112) by a peak detection or a sampling—inhibition, also followed by a comparison between the pulses, generation of a staircase signal $\epsilon_N$ and smoothing in order to obtain the definitive signal $\epsilon$.

According to a fundamental feature of the invention, the flags can also be used for generating the focusing error signals necessary for the vertical control of the writing and/or reading head. For this purpose, it is necessary to position two photodetector cells on either side of the optical axis of the focusing objective.

Figure 10:
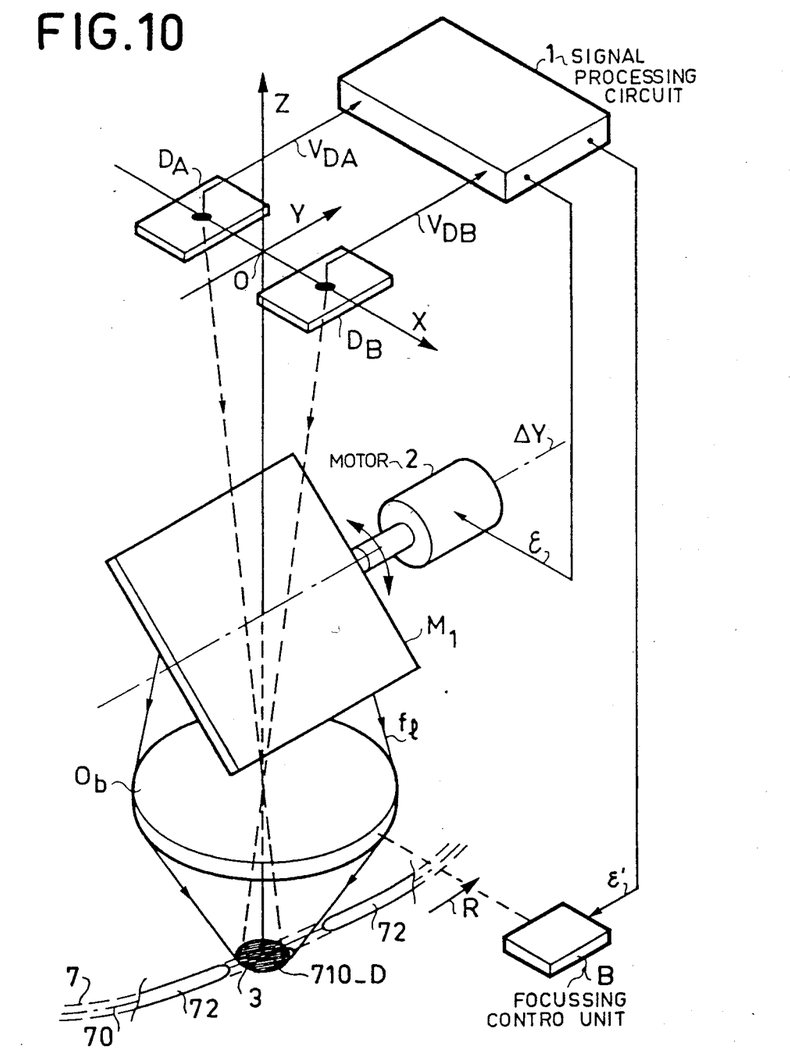
FIG. 10 the essential elements of a focusing device according to the invention.

FIG. 10 diagrammatically illustrates a configuration of this type, which has been reduced to what is absolutely necessary. A scanning beam, which can be the reading beam $f_1$ of the device of FIG. 1, is focused in a scanning spot 3 on the mean axis 70 of track 7. It is assumed that the radial tracking is correctly performed by one of the devices described hereinbefore. It is also possible to see the main elements described relative to FIG. 1, i.e. the focusing objective $O_b$, the focusing solenoid B driving the objective, the radial tracking mirror $M_1$ driven by a motor 2 about an axis $\Delta Y$ under the control of the radial tracking error signal $\epsilon$, and all these elements will not be described again.

It is also possible to see two photodiodes $D_A$ and $D_B$ on either side of axis Z, passing through the optical axis of objective $O_b$. These diodes are arranged in the plane XOY parallel to the plane of the disk carrying track 7 and on either side of axis OX parallel to direction R, which is the mean passage direction of the preetching in the scanning spot 3.

Although shown above the semitransparent mirror $M_1$, it is to be understood that the photodiodes can be integral with circuits 1, as shown in FIG. 1, by means of a set of deviating mirrors $M_1$ and $M_2$. These photodiodes can also be positioned beneath the disk, if the latter is read by transparency. The output signals of the photodiodes are transmitted to the electronic processing circuits included in circuitry 1 and which will be explained hereinafter.

Figure 11:
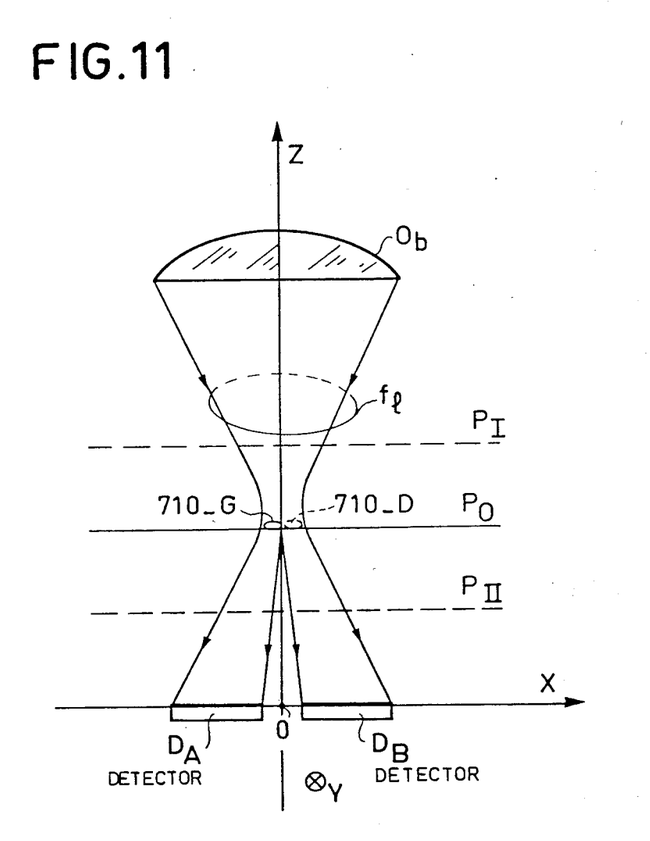
FIGS. 11 to 13 diagrams explaining the operation of the device.

The process will be described in greater detail relative to FIGS. 11 to 9, assuming a preetching of the type illustrated in FIG. 5, with alternating portions to the right and left from one preetching area to the next.

If focusing is correct, the incident scanning beam $f_1$ is assumed to be parallel, the latter being focused on the focal point of the objective in plane $P_0$ coinciding with the plane of the disk carrying the track 7 to be followed. In this case, the preetching, e.g. the portion displaced to the left 710-G, interferes with beam $f_1$ and, in accordance with the laws of optics, there is a diffraction producing orders of interference distributed in a symmetrical manner with respect to plane ZOY. The refracted energy is detected in equal parts by photodiodes $D_A$ and $D_B$. The same occurs during the passage of the following portion displaced to the right 710-D and so on.

However, outside the focusing plane, symmetry is no longer respected. Depending on whether the preetching portion is displaced to the right (710-D) or to the left (710-G), the effect of one of the half-beams, i.e. the parts of beam $f_1$ to the right or left of the plane of symmetry ZOY becomes preponderant. It then also follows that the energy detected by cells $D_A$ and $D_B$ is no longer identical for the alternating portions passing in the scanning beam.

If track 7 to be followed is comprised in a plane $P_I$ between the objective and its focal point (plane $P_0$), the signals detected by photodiode $D_A$ due to the portions which are displaced to the right (710-D) are more powerful than those detected by photodiode $D_B$. The opposite occurs during the passage of a portion displaced to the left (710-G).

Figure 12:
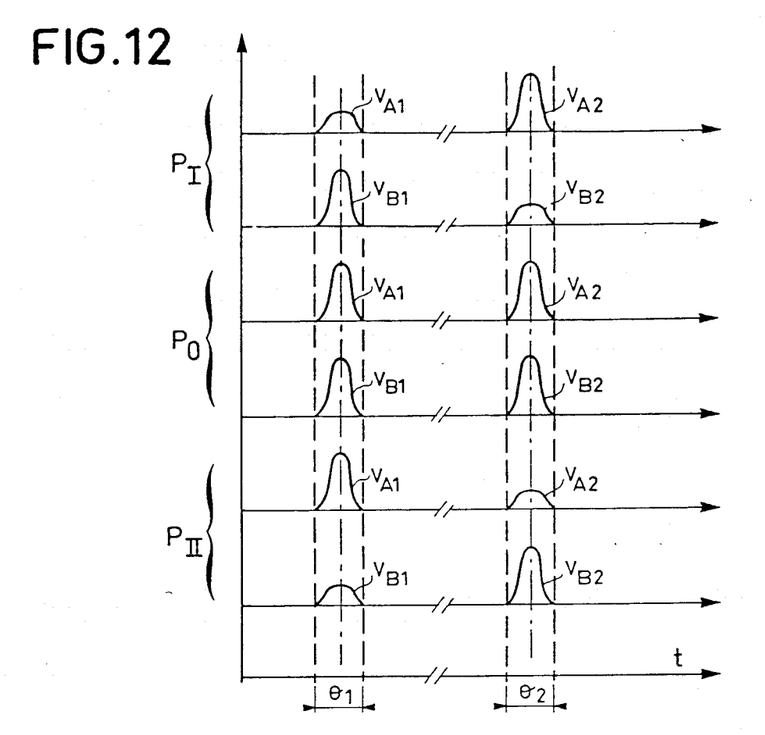

If the track 7 to be followed is comprised in a plane $P_{II}$ which is further from the objective than plane $P_0$, effects are observed at all points which are complementary to what has been described hereinbefore. The three cases are shown in the diagram of FIG. 12. The analysis windows $\theta_1$ and $\theta_2$ are determined by the passage time of the portions displaced in the scanning spot and in accordance with the processes described hereinbefore in connection with the determination of the radial tracking error, cf. FIG. 6. In order to determine the focusing error signal $\epsilon'$, integration or sampling takes place of the signals $V_A$ and $V_B$ detected during windows $\theta_1$: respectively $V_{A1}$ and $V_{B1}$ and $\eta_2$: respectively $V_{A2}$ and $V_{B2}$, followed by the algebraic operation:

$$(V_{A1}+V_{B2})-(V_{A2}+V_{B1}) \tag{1}$$

the result being proportional to the focusing error signal in both sign and amplitude.

Apart from the significant advantage of being able to overcome the influence of contrast variations due to the recording of useful information data along tracks, which may or may not be materialized by a preetching (e.g. smooth groove), the process according to the invention consisting of also deriving the focusing error signals from non-contiguous flags, has the additional advantage of not requiring precise positionings of the cells, said operations being difficult to carry out.

Figure 13:
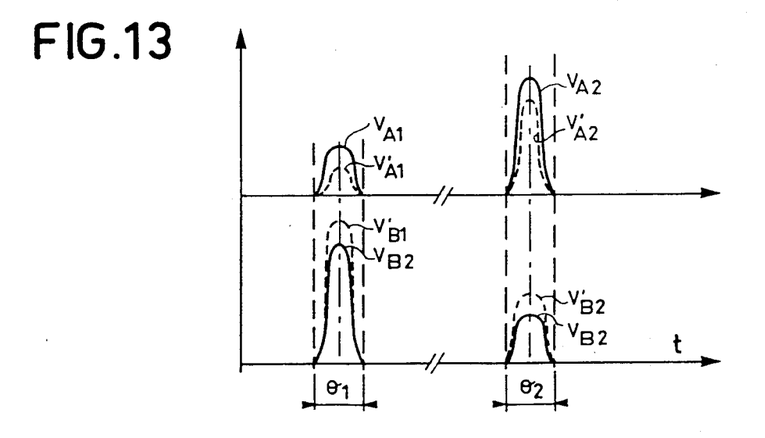

Thus, if for any reason the cells are displaced relative to axis OZ (FIG. 10), all other factors remain constant, one of the photodiodes, e.g. photodiode $D_A$ detects less energy and the other $D_B$ more energy. This case is illustrated in FIG. 13.

If $V_{A1}$ to $V_{B2}$ are pulses detected with the correct positioning of the photodiodes and $V'_{A1}$ to $V'_{B2}$ the pulses detected in the real positioning, no matter what the focusing state, the following relations are proved:

| | |
|---|---|
| $V_{A1} > V'_{A1}$ | (2) |
| $V_{A2} > V'_{A2}$ | (3) |
| $V_{B1} < V'_{B1}$ | (4) and |
| $V_{B2} < V'_{B2}$ | (5) |

On carrying out the calculation according to relation (1), it follows that there is a total or at least partial compensation and the focusing error signal varies only slightly, even if there is offcentring of the pair of photodiodes $D_A$ and $D_B$. In most cases, it is possible to omit any adjustment means, with the exception of an initial position adjustment carried out once and for all.

Figure 14:
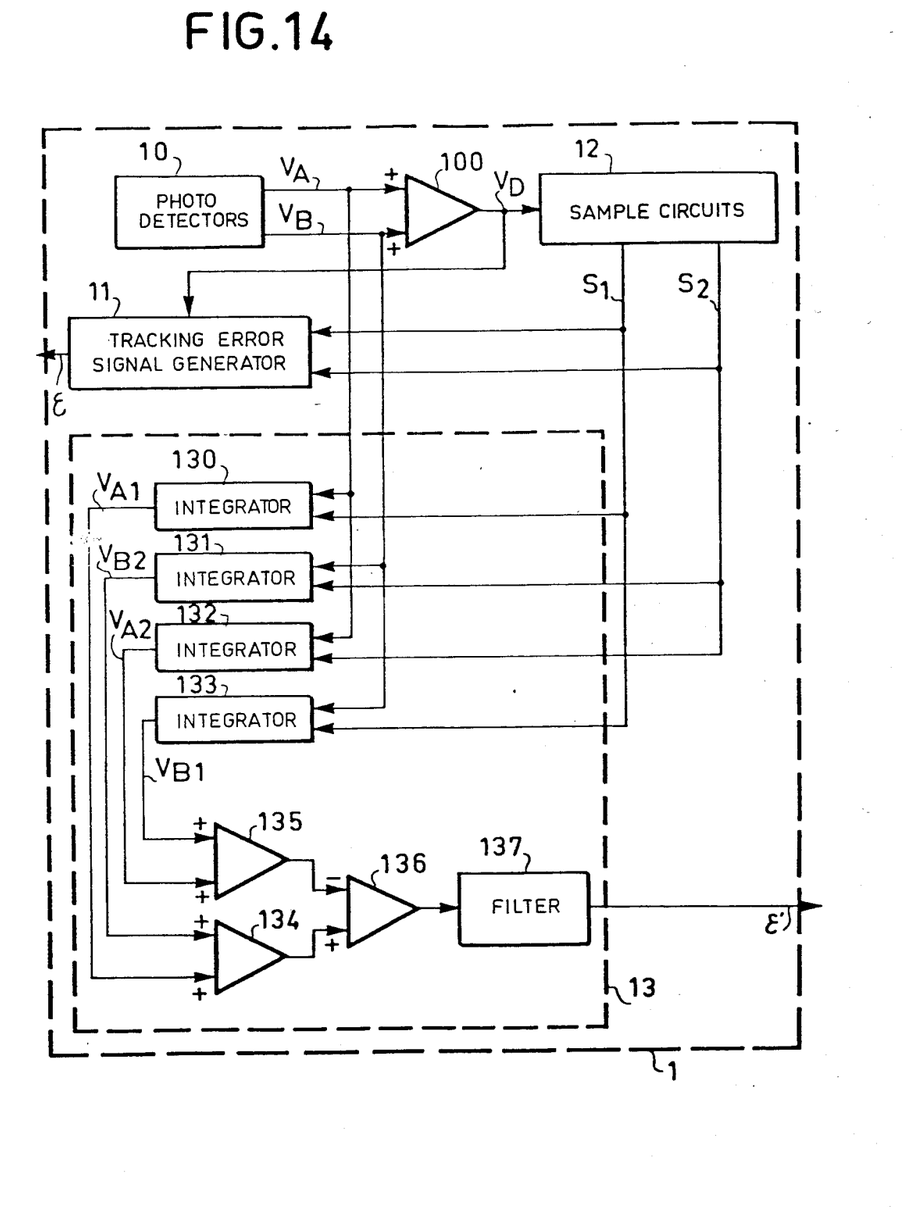
FIG. 14 a circuit diagram of a device which, according to a preferred variant of the invention, simultaneously permits the radial following of the track and focusing.

Although the processes for the generation of focusing or vertical control and radial tracking error signals on the basis of non-contiguous, discrete preetching detections can be realized in an autonomous manner, according to a preferred variant of the invention these two controls are performed simultaneously. For this purpose, the device according to FIG. 6 must be modified and supplemented. A device of this type permitting the correct focusing is illustrated in FIG. 14. The circuitry common to FIGS. 6 and 14 carries the same references and will not be described again.

The detector comprising two photodiodes $D_A$ and $D_B$ (FIG. 10) supplies two output signals $V_A$ and $V_B$. To permit use by sampling circuits 12, these signals can be combined into a single signal, e.g. $V_D$, with the aid of a summing amplifier 100, said signal also being transmitted in the manner described hereinbefore to the radial tracking error signal processing circuits 11. These circuits receive the two sampling signals $S_1$, $S_2$ determining windows $\theta_1$ and $\theta_2$. The device also comprises focusing error signal processing circuits. For this purpose it must have four memory-possessing integrators 130 to 133, whose operation is respectively authorized in window $\theta_1$ (signal $S_1$) for integrators 130 and 132 and in window $\theta_2$ (signal $S_2$) for integrators 131, 133. These integrators supply signals $V_{A1}$, $V_{B2}$, $V_{A2}$ and $V_{B1}$ respectively at the output of integrators 130, 131, 132, 133. The outputs of integrators 130, 131 and the outputs of integrators 132, 133 are transmitted, for example, to the inputs of two unity gain summing amplifiers, respectively 134, 135. The signals at the outputs of these two amplifiers 134, 135 are in turn transmitted to the differential inputs of an amplifier 136, e.g. of unity gain, respectively the positive and negative inputs, which completes the calculation according to relation 1. In reality, the output signal is a staircase signal $\epsilon'_N$, the results being stored between two calculations. In order to be usable, signal $\epsilon'_N$ must be smoothed by a low-pass filter 137, whose output supplies the analog-type focusing error signal $\epsilon'$.

The invention is not limited to the arrangements described hereinbefore. In particular, devices simultaneously permitting the correct focusing and radial tracking can be obtained by modifying and supplementing the radial tracking devices, in an identical manner to that carried out on the device of FIG. 5 to obtain the device of FIG. 14.

The essential feature of the invention is the use of discrete preetchings or flags, whereof at least one portion is displaced relative to the mean axis of the tracks to be followed, the generation of an electrical signal derived from the detection of the interaction of a beam focused with these preetchings and the processing of this signal with the aid of electronic circuits in a differentiated manner, as a function of whether it is wished to generate a radial tracking error signal or a vertical control signal.

The process of the invention has the particular advantages of only requiring a rough adjustment of the position of the photodetectors, of eliminating any external wobbulation means generally necessary when using conventional etching, and of eliminating any interaction between the recording of use ful information data and the radial following of the track and focusing.

What is claimed is:

1. A data carrier having a plurality of adjacent track elements for digital data storage in allotted non-contiguous portions of said track elements on a reference surface, said data carrier comprising:
    prerecorded first flag means repeatedly arranged along first further portions of each one of said track elements for delineation of a mean axis of scan thereof;
    prerecorded second flag means repeatedly arranged along second further portions of each one of said track elements for synchronization of the lengthwise scanning of said track elements with an illuminating spot focused on said reference surface;
    both said first and second further portions being intermediate said non-contiguous portions;
    both said first and second flag means being made of spaced island shaped marks having on said reference surface a closed outline of substantially uniform width measured transversely of said mean axis of scan;
    each of said first flag means comprising at least one of said island shaped marks offset in relation with said mean axis of scan;
    each of said second flag means comprising at least two of said marks succeeding one another for forming a specific array distinguishable by its mark lengths and spacing from any other data entity available on said reference surface.

2. A data carrier as claimed in claim 1, wherein from one of said first flag means to the next one, said offset is changed from one side of said mean axis to the other.

3. A data carrier as claimed in claim 1, wherein each of said first flag means comprises in the direction of scanning a first mark offset on a first side of said mean axis and a second mark offset on a second side of said mean axis.

4. A flag carrier as claimed in claim 3, wherein each one of said second flag means is immediately followed by one of said first flag means.

5. A data carrier as claimed in claim 1, wherein at least one of said first flag means is arranged between one and the next one of said second flag means.

6. A data carrier as claimed in claim 1, wherein said marks are preengraved on said reference surface.

7. A data carrier as claimed in claim 6, wherein said non-contiguous portions are preengraved prior to any digital data storage.

8. A data carrier as claimed in claim 6, wherein the marks of said second flag means are centered on said mean axis.

9. A data carrier as claimed in claim 1, wherein the spatial distribution of said flag means is uniform along said track elements.

10. A device for generating signals controlling the scanning of any one of the adjacent track elements arranged on the reference surface of a data carrier as claimed in claim 1, said scanning being accomplished with an illuminating spot focused from a source of radiant energy, said device comprising:
    optoelectronic detection means collecting via an objective lens radiation arising from the optical interaction of said spot with said reference surface for supplying a read out electrical signal;
    identification means receiving said electrical signal for producing a recognition signal each time one of said second flag means is lengthwise scanned with said spot;
    generator means for deriving from said recognition signal delayed sampling pulses, said sampling pulses being respectively emitted while scanning marks of said first flag means which are offset on opposite sides of said mean axis; and
    extracting means receiving said electrical signal and said sampling pulses for supplying a signal representative of the offset of said beam in relation with said mean axis.

11. A device for generating signals controlling the scanning of any one of the adjacent track elements arranged on the reference surface of a data carrier as claimed in claim 1, said scanning being accomplished with an illuminating spot focused from a source of radiant energy, said device comprising:
    optoelectronic detection means collecting via an objective lens radiation arising from the optical interaction of said spot with said reference surface for supplying first and second readout electrical signals;

said optoelectronic detection means comprising first and second photodetector cells respectively arranged on each side of a plane containing the optical axis of said objective lens and parallel to the direction of scan of said track elements for respectively delivering said first and second readout electrical signals;

identification means receiving said electrical signal for producing a recognition signal each time one of said second flag means is lengthwise scanned with said spot;

generator means for deriving from said recognition signal delayed sampling pulses, said sampling pulses being respectively emitted while scanning marks of said first flag means, which are offset on opposite sides of said mean axis;

first extracting means receiving said electrical signals and said sampling pulses for supplying a signal representative of the offset of said beam in relation with said mean axis; and second extracting means receiving said electrical signals and said sampling pulses for supplying a signal representative of the distance separating the focal point of said source from said reference surface.

12. A device as claimed in claim 11, wherein said second extracting means comprises;

first, second, third, and fourth integrator means each having a signal input, a signal output and a control input;

the signal inputs of said first and third integrator means being fed with said first readout electrical signal, and the signal inputs of said secnd and fourth integrator means being fed with said readout electrical signal; the control inputs of said first and fourth integrator means receiving one of said delayed sampling pulses and the control inputs of said second and third integrator means receiving the other one of said delayed sampling pulses;

two summing circuits respectively connected to the outputs of said first and second integrator means and to the outputs of said third and fourth integrator means, said second extracting means comprising a differential amplifier having its inputs respectively connected to the outputs of said summing circuits.

13. A device as claimed in any one of claims 10 or 11, wherein said generator means comprises counter means having a resetting input fed with said recognition signal, and incrementation input, and a binary word output connected to a decoder means for supplying said delayed sampling pulses, said incrementation input being fed with a signal supplied by said identification means while scanning with said spot said first flag means.

14. A device as claimed in any one of claims 10 or 11, wherein said extracting means comprises integrator means having two differential inputs respectively connected to first and second switching means fed with said optoelectronic detection means, said first and second switching means being controlled with said delayed sampling pulses, said integrator means having an output for delivering said signal representative of the offset of said beam in relation to said mean axis.

15. A process for generating signals controlling the scanning of any one of the adjacent track elements arranged on the reference surface of a data carrier as claimed in claim 1, said scanning being accomplished with an illuminating spot focused from a souce of radiant energy, said process comprising the steps of receiving on a photodetector means radiation arising from the optical interaction of said spot with said reference surface for supplying a readout electrical signal;

issuing a recognition signal upon sensing a portion of said readout electrical signal corresponding to the lengthwise scanning with said spot of one of said second flag means;

generating in response to said recognition signal, delayed sampling pulses respectively emitted while scanning marks in said first flag means respectively offset on opposite sides of said mean axis; and using said sampling pulses for extracting from said electrical signal a signal representative of the offset of said beam in relation with said mean axis.

16. A process for generating signals controlling the scanning of any one of the adjacent track elements arranged on the reference surface of a data carrier as claimed in claim 1, said scanning being accomplished with an illuminating spot focused from a source of radiant energy, said process comprising the steps of:

receiving, via an objective lens having an optical axis, radiation arising from the optical interaction of said spot with said reference surface, said radiation being collected with first and second photodetector cells respectively arranged on said side of a plane containing said optical axis and parallel to the direction of scan of said track elements for respectively providing first and second readout electrical signals;

issuing a recognition signal upon sensing a portion of said readout electrical signals corresponding to the lengthwise scanning with said spot of one of said second flag means;

generating in response to said recognition signal, delayed sampling pulses respectively emitted while scanning marks of said first flag means respectively offset on opposite sides of said mean axis; and using said sampling pulses for extracting from said readout electrical signals a first signal representative of the offset of said beam in relation of said mean axis, and a second signal representative of the distance separating the focal point of said source from said reference surface.

* * * * *